(12) United States Patent
Bajpai et al.

(10) Patent No.: US 10,044,554 B2
(45) Date of Patent: Aug. 7, 2018

(54) ANALYZING DROPPED WIRELESS LOCAL AREA NETWORK CONNECTIONS

(71) Applicant: Verizon Patent and Licensing Inc., Arlington, VA (US)

(72) Inventors: Pranay Bajpai, Flower Mound, TX (US); Nagaraju Manchiraju, Bridgewater, NJ (US); Radha Sankaran, Basking Ridge, NJ (US); Sridhar Jayaprakash, Parsippany, NJ (US); Srinivasa Rao Kella, Somerset, NJ (US); Wai Kei Michael Lau, Bedminster, NJ (US); Nebyate Endalamaw, Cedar Hill, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 246 days.

(21) Appl. No.: 14/847,341

(22) Filed: Sep. 8, 2015

(65) Prior Publication Data
US 2017/0070380 A1    Mar. 9, 2017

(51) Int. Cl.
*H04L 29/08* (2006.01)
*H04L 12/24* (2006.01)
*H04W 24/04* (2009.01)
*H04W 84/12* (2009.01)

(52) U.S. Cl.
CPC ...... *H04L 41/0631* (2013.01); *H04L 41/0677* (2013.01); *H04L 67/14* (2013.01); *H04W 24/04* (2013.01); *H04W 84/12* (2013.01)

(58) Field of Classification Search
CPC ............... H04L 47/746; H04L 41/5006; H04L 12/2422; H04L 67/14; H04W 76/027
See application file for complete search history.

(56) References Cited

U.S. PATENT DOCUMENTS

| 2008/0256632 | A1* | 10/2008 | Stockdell | H04L 63/1458 726/22 |
| 2010/0180190 | A1* | 7/2010 | Carroll | H04M 11/10 715/224 |
| 2015/0163106 | A1* | 6/2015 | Satyanarayanan | H04L 12/1822 348/14.08 |
| 2016/0270143 | A1* | 9/2016 | Tachikawa | H04W 12/12 |

* cited by examiner

*Primary Examiner* — Salvador E Rivas

(57) ABSTRACT

A device may aggregate dropped connection information associated with multiple dropped network connections. The dropped connection information may include at least one of: information associated with a mobile device that experienced a dropped network connection, information associated with a user of the mobile device, information associated with an access point that experienced the dropped network connection, information associated with a network from which the mobile device was dropped, or information that identifies a location associated with the dropped network connection. The device may identify a pattern associated with the multiple dropped network connections based on aggregating the dropped connection information, and may provide reporting information associated with the pattern.

20 Claims, 7 Drawing Sheets

ANALYZING DROPPED WIRELESS LOCAL AREA NETWORK CONNECTIONS

BACKGROUND

A wireless local area network (WLAN) may refer to a wireless network that links two or more devices using a wireless distribution method within a limited area, such as a home, a school, a computer laboratory, or an office building. This gives mobile devices the ability to move around within a local coverage area and still be connected to the network, and can provide a connection to the wider Internet. An example of a WLAN includes a WLAN based on the Institute of Electrical and Electronics Engineers (IEEE) 802.11 standards, sometimes referred to as Wi-Fi.

DETAILED DESCRIPTION OF PREFERRED EMBODIMENTS

The following detailed description of example implementations refers to the accompanying drawings. The same reference numbers in different drawings may identify the same or similar elements.

A mobile device may use a wireless access point (e.g., a wireless local area network (WLAN) access point) to access a network. In some cases, the mobile device may be dropped from (e.g., may lose a connection with) the wireless access point and/or a WLAN accessible via the wireless access point due to a problem with the mobile device, a problem with the wireless access point, a problem with the WLAN, or the like. Implementations described herein provide a way to identify such problems by analyzing dropped connection information for patterns associated with dropped WLAN connections. In this way, network reliability may be increased, and network resources may be conserved by preventing dropped WLAN connections.

Figure 1:
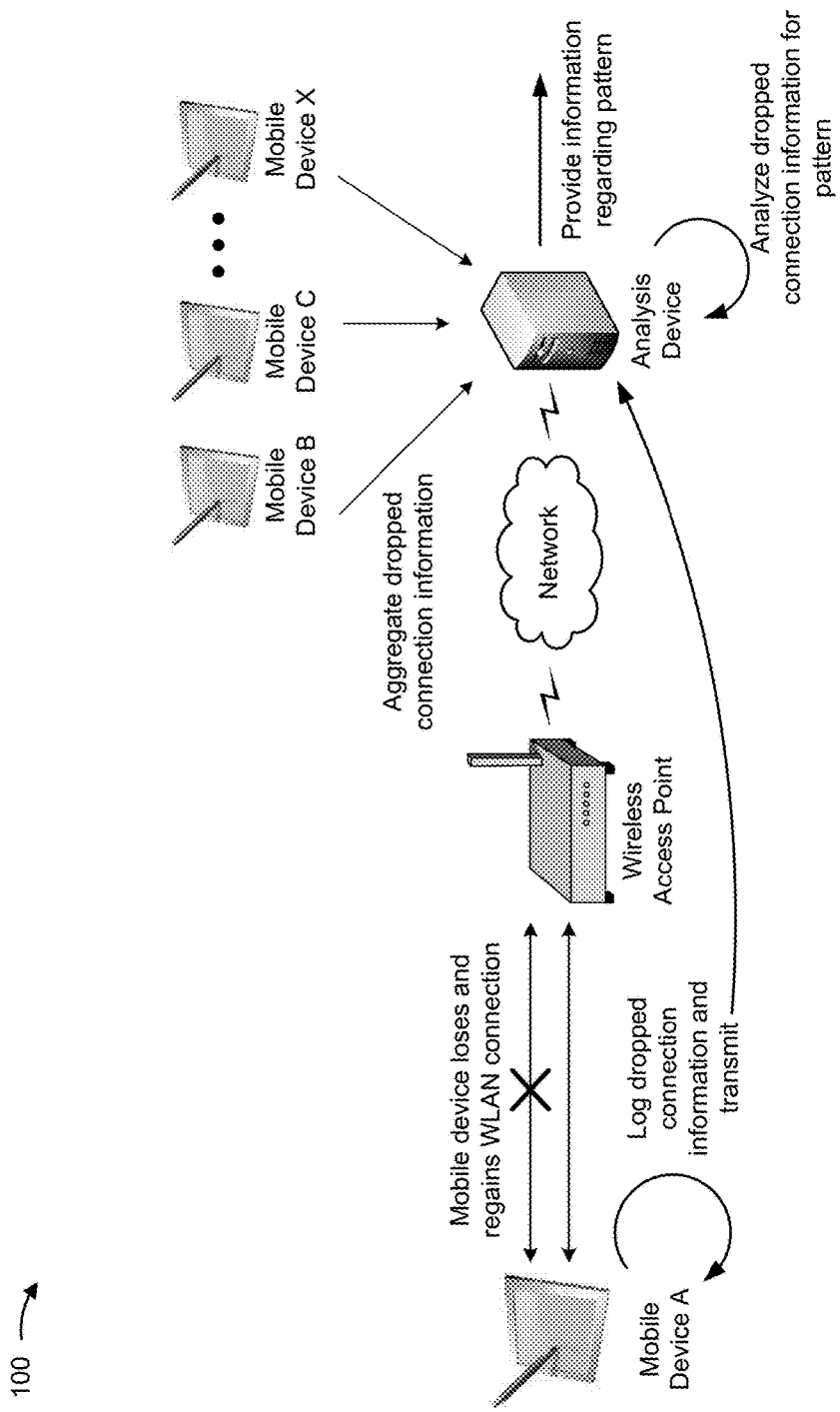
FIG. 1 is a diagram of an overview of an example implementation described herein.

FIG. 1 is a diagram of an overview of an example implementation 100 described herein. As shown in FIG. 1, a mobile device, shown as Mobile Device A, may lose a WLAN connection with a wireless access point, and may regain (e.g., re-establish) the WLAN connection with the wireless access point. Based on losing and regaining the WLAN connection, Mobile Device A may log dropped connection information, and may transmit the dropped connection information to an analysis device (e.g., one or more servers). The dropped connection information may include, for example, information associated with the dropped connection, information associated with Mobile Device A, information associated with a user of Mobile Device A, information associated with the wireless access point, information associated with a WLAN, or the like, as described in more detail elsewhere herein.

As further shown in FIG. 1, the analysis device may receive and aggregate dropped connection information associated with multiple mobile devices (e.g., Mobile Device A, Mobile Device B, Mobile Device C, Mobile Device X, etc.). The dropped connection information may be associated with multiple dropped connections, multiple mobile devices, multiple mobile device users, multiple wireless access points, multiple WLANs, or the like. As shown, the analysis device may analyze the dropped connection information for one or more patterns, such as a pattern indicative of a problem associated with the dropped connections. The analysis device may provide information regarding the pattern. For example, the analysis device may provide information regarding the pattern to a device associated with a party responsible for correcting a problem indicated by the pattern. In this way, the analysis device may identify problems associated with dropped WLAN connections, and may provide information for correcting the problems, thereby improving WLAN reliability and conserving network resources that would otherwise be wasted for dropped connections.

In some cases, the analysis device may cause an action to be performed, such as by sending an instruction to a wireless access point and/or a mobile device. For example, the analysis device may send an instruction to cause the wireless access point and/or the mobile device to reboot, to report logged information, to shut down, to install software, to update software, to run a self-check, or the like. In this way, the analysis device may assist in automatically resolving problems with dropped connections.

Figure 2:
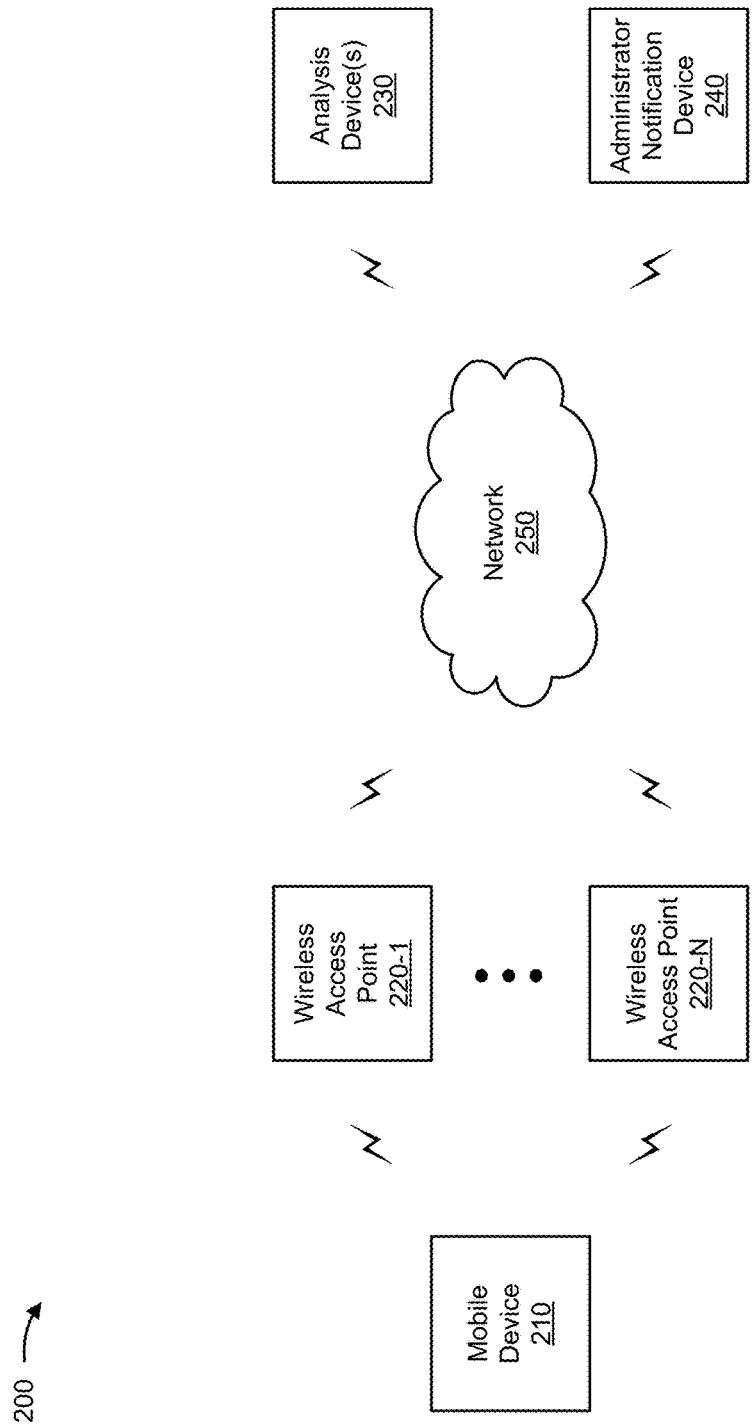
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 210, one or more wireless access points 220-1 through 220-N (N≥1) (hereinafter referred to collectively as "wireless access points 220," and individually as "wireless access point 220"), an analysis device 230, an administrator notification device 240, and a network 250. Devices of environment 200 may interconnect via wired connections, wireless connections, or a combination of wired and wireless connections.

Mobile device 210 may include one or more devices capable of connecting to a network (e.g., a WLAN), and capable of receiving, generating, storing, processing, and/or providing dropped connection information associated with a network connection (e.g., a WLAN connection). For example, mobile device 210 may include a communication device, such as a mobile phone (e.g., a smart phone, a radiotelephone, etc.), a tablet computer, a laptop computer, a gaming device, a wearable communication device (e.g., a smart wristwatch, a pair of smart eyeglasses, etc.), or a similar type of device. In some implementations, mobile device 210 may be associated with and/or owned by a first party, such as a network operator, a retail store owner, a venue operator, or the like. In some implementations, mobile device 210 may not be associated with and/or owned by the first party. For example, mobile device 210 may be associated with and/or owned by a customer of the network operator, a customer of the retail store, an attendee of the venue, or the like.

Wireless access point 220 may include one or more devices capable of communicating wirelessly with local devices (e.g., via a WLAN connection), such as mobile device 210, and providing connectivity, for the local devices, to devices connected to another network, such as network 250. For example, wireless access point 220 may include a router, a modem, a switch, a hub, a bridge, a gateway, a WLAN access point, or a similar type of device. Wireless access point 220 may communicate wirelessly using one or more short-range wireless communication protocols, such as, for example, IEEE 802.15 (e.g., Bluetooth), IEEE 802.11 (e.g., Wi-Fi), or the like.

Analysis device 230 may include one or more devices capable of receiving, generating, storing, processing, and/or providing dropped connection information associated with one or more mobile devices 210. For example, analysis device 230 may include a server or a similar type of device. In some implementations, analysis device 230 may include one or more servers included in a data center, a cloud computing environment, or the like.

Administrator notification device 240 may include one or more devices capable of receiving, generating, storing, processing, and/or providing a notification associated with dropped connection information (e.g., information associated with a pattern identified in the dropped connection information). For example, administrator notification device 240 may include a mobile phone, a tablet computer, a laptop computer, a desktop computer, a server, or a similar type of device. In some implementations, analysis device 230 and administrator notification device 240 may be implemented as a single device.

Network 250 may include one or more wired and/or wireless networks. For example, network 250 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
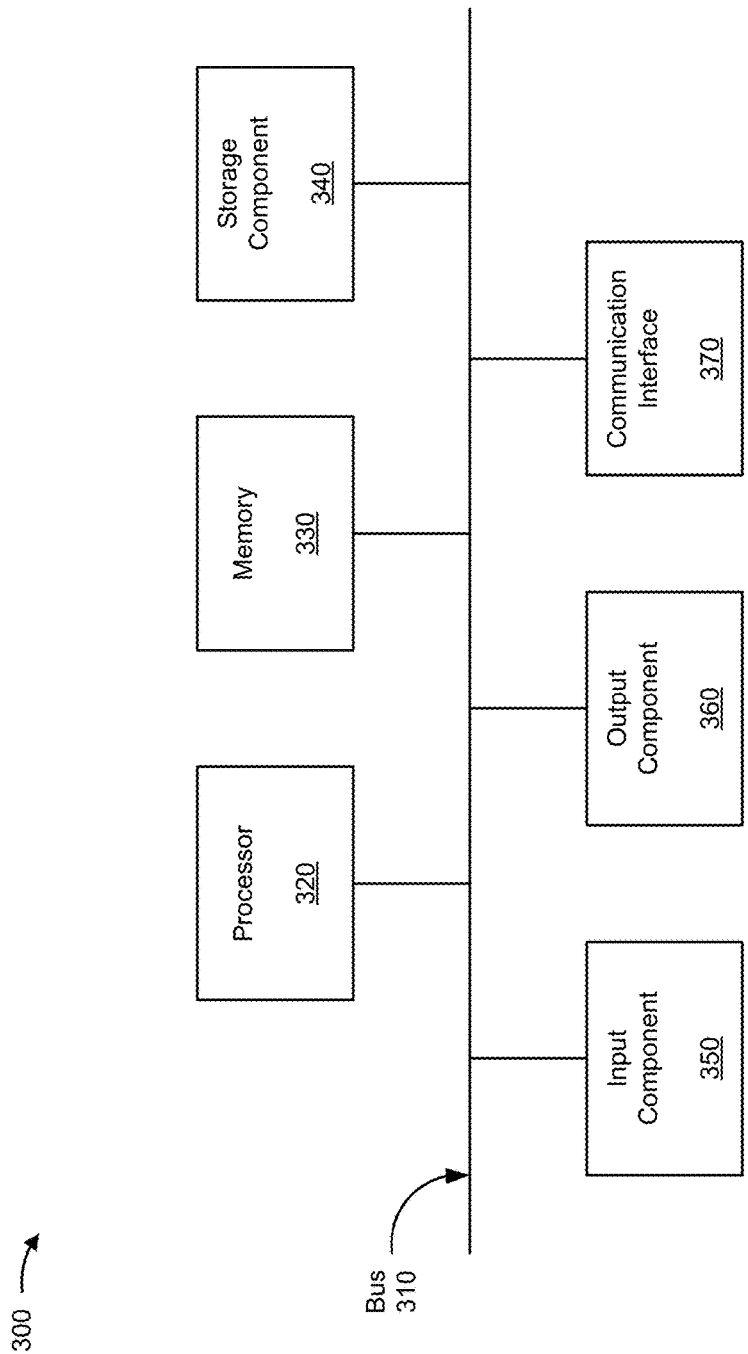
FIG. 3 is a diagram of example components of one or more devices of FIG. 2.

FIG. 3 is a diagram of example components of a device 300. Device 300 may correspond to mobile device 210, wireless access point 220, analysis device 230, and/or administrator notification device 240. In some implementations, to mobile device 210, wireless access point 220, analysis device 230, and/or administrator notification device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
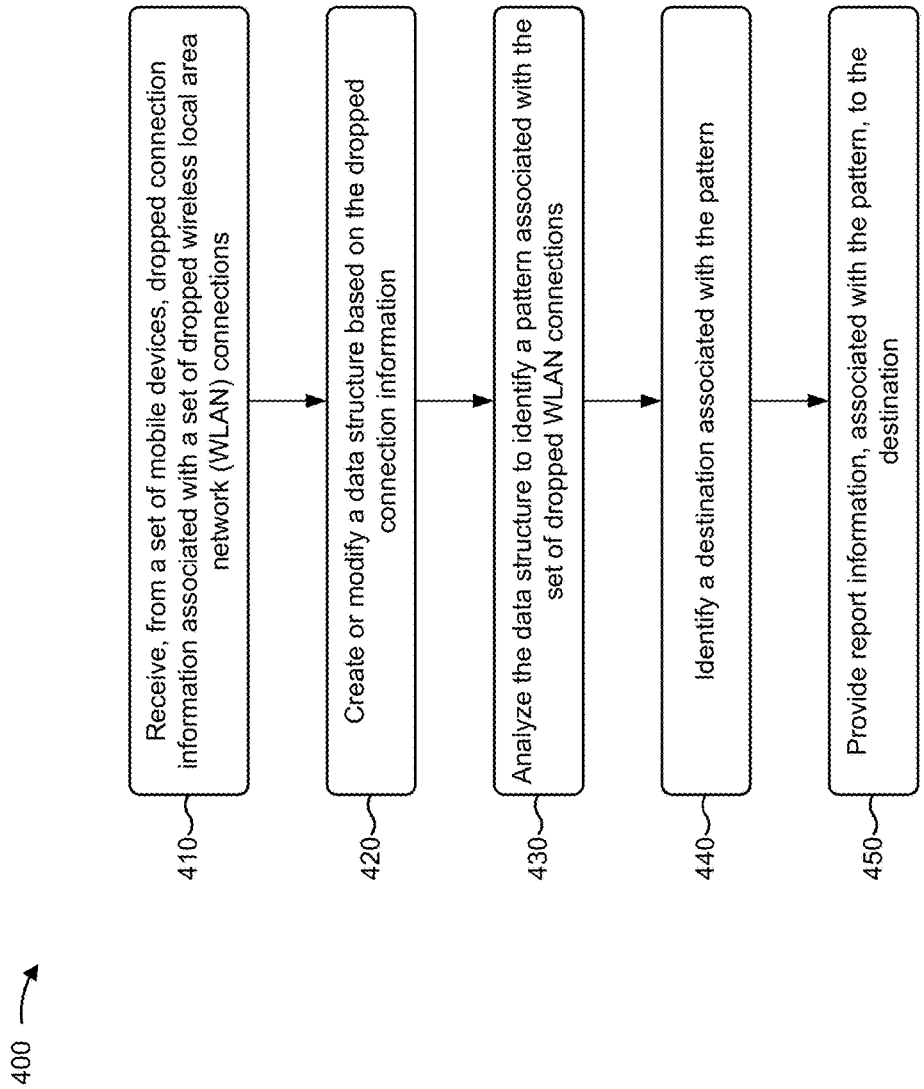
FIG. 4 is a flow chart of an example process for analyzing dropped wireless local area network connections.

FIG. 4 is a flow chart of an example process 400 for analyzing dropped wireless local area network connections. In some implementations, one or more process blocks of FIG. 4 may be performed by analysis device 230. In some implementations, one or more process blocks of FIG. 4 may be performed by another device or a group of devices separate from or including analysis device 230, such as mobile device 210, wireless access point 220, and/or administrator notification device 240.

As shown in FIG. 4, process 400 may include receiving, from a set of mobile devices, dropped connection information associated with a set of dropped wireless local area network (WLAN) connections (block 410). For example, mobile device 210 may be connected, via a WLAN connection, to wireless access point 220. The WLAN connection between mobile device 210 and wireless access point 220 may be dropped. For example, mobile device 210 and/or wireless access point 220 may lose a WLAN signal, may lose communication with one another, or the like. In this case, mobile device 210 may log (e.g., determine and store) dropped connection information associated with the dropped connection, and may send the dropped connection information to analysis device 230 (e.g., upon establishing another network connection, such as re-establishing the WLAN connection or establishing another type of network connection). Additionally, or alternatively, wireless access point 220 may log dropped connection information, and may send the dropped connection information to analysis device 230. Analysis device 230 may receive dropped connection information associated with one or more dropped connections, one or more mobile devices 210, one or more wireless access points 220, one or more users, one or more networks, or the like.

In some implementations, analysis device 230 may receive dropped connection information from mobile devices 210 associated with and/or owned by a first party, such as a network operator, a retail store owner, a venue operator, or the like. Additionally, or alternatively, analysis device 230 may receive dropped connection information from mobile devices 210 associated with and/or owned by second party, such as a customer of the network operator, a customer of the retail store, an attendee of the venue, or the like. Thus, analysis device 230 may receive dropped connection information from only the mobile devices 210 associated with the first party, from only the mobile devices 210 associated with the second party, or from both mobile devices 210 associated with the first party and mobile devices 210 associated with the second party.

In some implementations, the dropped connection information may include information associated with the dropped connection. For example, the dropped connection information may include a downtime indicator that indicates a time when the connection was dropped, an uptime indicator that indicates a time when the connection was restored, a downtime duration indicator that indicates a length of time that the dropped connection was down, or the like. This information may be beneficial in determining an occurrence and a duration of the dropped connection.

Additionally, or alternatively, the dropped connection information may include information associated with mobile device 210 involved with the dropped connection. For example, the dropped connection information may include a mobile device identifier that identifies mobile device 210. In some implementations, the mobile device identifier may include a unique mobile device identifier, such as a media access control (MAC) address, or a temporary mobile device identifier, such as a network address (e.g., an Internet Protocol (IP) address) assigned to mobile device 210. Additionally, or alternatively, the dropped connection information may include a mobile device type identifier that identifies a device type of mobile device 210 (e.g., a tablet computer, a specific type of tablet computer, a mobile phone, a specific type of mobile phone, etc.). Additionally, or alternatively, the dropped connection information may identify a location associated with mobile device 210 (e.g., a geographic location of mobile device 210, a store associated with mobile device 210, etc.). This information may be beneficial in determining a mobile device 210 associated with the dropped connection.

In some implementations, the information associated with mobile device 210 may include information associated with software executing on mobile device 210. For example, the dropped connection information may include an operating system type identifier that identifies a type of operating system installed on and/or executing on mobile device 210 (e.g., iOS, Android, Windows, etc.), an operating system version identifier that identifies a version of an operating system installed on and/or executing on mobile device 210, an application identifier that identifies an application installed on and/or executing on mobile device 210 (e.g., a browser application, a web application, etc.), an application version identifier that identifies a version of an application installed on and/or executing on mobile device 210, or the like. This information may be beneficial in determining software (e.g., an operating system, an application, etc.) associated with the dropped connection.

Additionally, or alternatively, the dropped connection information may include information associated with a user of mobile device 210 involved with the dropped connection. For example, the dropped connection information may include a user identifier that identifies a user who is logged into mobile device 210 and/or an application executing on mobile device 210 when the dropped connection occurs. Additionally, or alternatively, the dropped connection information may identify a location associated with the user. This information may be beneficial in determining a location associated with the dropped connection.

Additionally, or alternatively, the dropped connection information may include information associated with wireless access point 220 involved with the dropped connection. The wireless access point 220 involved with the dropped connection may include a first wireless access point 220 with which a connection was dropped and/or a second wireless access point 220 with which a connection was established. In some implementations, the first wireless access point 220 and the second wireless access point 220 may be a same wireless access point 220 (e.g., the connection may be dropped from and re-established with the same wireless access point 220). In some implementations, the first wireless access point 220 and the second wireless access point 220 may be different wireless access points 220 (e.g., a first connection may be dropped from one wireless access point 220, and a second connection may be established with another wireless access point 220). This information may be beneficial in determining a wireless access point 220 associated with the dropped connection.

For example, the dropped connection information may include an access point identifier that identifies wireless access point 220. The access point identifier may include, for example, a media access control (MAC) address of wireless access point 220, a name of wireless access point 220, a basic service set identifier (BSSID) that identifies wireless access point 220, or the like. Additionally, or alternatively, the dropped connection information may identify a location associated with wireless access point 220. This information may be beneficial in determining a wireless access point 220 associated with the dropped connection.

Additionally, or alternatively, the dropped connection information may include information associated with a network (e.g., a WLAN) involved with the dropped connection. The network involved with the dropped connection may include a first network with which a connection was dropped (e.g., via which connectivity was lost) and/or a second network with which a connection was established. In some implementations, the first network and the second network may be a same network (e.g., the connection may be dropped from and re-established with the same network). In some implementations, the first network and the second network may be different networks (e.g., a first connection may be dropped from one network, and a second connection may be established with another network). This information may be beneficial in determining a network associated with the dropped connection.

For example, the dropped connection information may include a network identifier that identifies a network involved with the dropped connection. The network identifier may include, for example, a network name, a service set identifier (SSID) that identifies a network, or the like. Additionally, or alternatively, the dropped connection information may identify a location associated with a network. This information may be beneficial in determining a network associated with the dropped connection.

In some implementations, the dropped connection information may include information associated with multiple dropped connections. The multiple dropped connections may be associated with one or more mobile devices 210, one or more users, one or more wireless access points 220, one or more networks, one or more locations, or the like. In some implementations, the dropped connection information may include information associated with multiple mobile devices 210. The multiple mobile devices 210 may be associated with one or more users, one or more wireless access points 220, one or more networks, one or more locations, or the like.

In some implementations, the dropped connection information may include information associated with multiple users. The multiple users may be associated with one or more mobile devices 210, one or more wireless access points 220, one or more networks, one or more locations, or the like. In some implementations, the dropped connection information may include information associated with multiple wireless access points 220. The multiple wireless access points 220 may be associated with one or more mobile devices 210, one or more users, one or more networks, one or more locations, or the like.

In some implementations, the dropped connection information may include information associated with multiple networks. The multiple networks may be associated with one or more mobile devices 210, one or more users, one or more wireless access points 220, one or more locations, or the like. In some implementations, the dropped connection information may include information associated with multiple locations. The multiple locations may be associated with one or more mobile devices 210, one or more users, one or more wireless access points 220, one or more networks, or the like.

In this way, analysis device 230 may aggregate information associated with multiple dropped connections, multiple mobile devices 210, multiple users, multiple wireless access points 220, multiple networks, multiple locations, and/or the like, and may analyze the aggregated information to identify patterns associated with dropped network connections. The patterns may indicate problems associated with dropped network connections, which may be resolved to improve network reliability.

As further shown in FIG. 4, process 400 may include creating or modifying a data structure based on the dropped connection information (block 420). For example, analysis device 230 may create a data structure (e.g., an index, a table, a database, etc.) based on the dropped connection information, and may store the dropped connection information in the data structure. Additionally, or alternatively, analysis device 230 may add information to a data structure by receiving dropped connection information and storing the dropped connection information in the data structure.

As an example, the dropped connection information may include a field identifier that identifies a type of value stored in a field (e.g., a field identifier of "Mobile Device Type") and a value for the field (e.g., "Tablet Computer"). Analysis device 230 may use field identifiers and/or field values to generate and/or modify the data structure (e.g., to index a value using a field identifier). In some implementations, the data structure may be searchable so that patterns can be identified from the dropped connection information.

As further shown in FIG. 4, process 400 may include analyzing the data structure to identify a pattern associated with the set of dropped WLAN connections (block 430). For example, analysis device 230 may analyze the dropped connection information, stored in the data structure, to identify a pattern associated with the dropped connection information. The pattern may indicate a problem (e.g., a repeated problem) associated with the dropped connections. In some implementations, analysis device 230 may use statistical analysis, machine learning, or the like, to identify the pattern.

In some implementations, analysis device 230 may identify the pattern by determining that a value appears a threshold quantity of times in the data structure. Similarly, analysis device 230 may determine that the value appears a threshold quantity of times in dropped connection information associated with different occurrences of a dropped connection, occurs a threshold quantity of times in association with different occurrences of a dropped connection, or the like.

As an example, a value of "192.24.1.1" may appear a threshold quantity of times in a "Device IP Address" field in dropped connection information associated with different occurrences of dropped connections. This may indicate that a mobile device 210 with an IP address of 192.24.1.1 experienced a dropped connection a threshold quantity of times. This may indicate, for example, that the mobile device 210 is associated with a network connectivity problem.

In some implementations, analysis device 230 may identify the pattern by determining that a combination of values appears a threshold quantity of times in the data structure. Similarly, analysis device 230 may determine that the combination of values appears a threshold quantity of times in dropped connection information associated with different occurrences of a dropped connection, occurs a threshold quantity of times in association with different occurrences of a dropped connection, or the like.

As an example, the combination of values of "Tablet Computer" and "iOS" may appear a threshold quantity of times in a "Device Type Identifier" field and an "Operating System Type" field, respectively, in dropped connection information associated with different occurrences of dropped connections. This may indicate that mobile devices 210 that are tablet computers executing the iOS operating system experienced a dropped connection a threshold quantity of times. This may indicate, for example, that tablet computers executing iOS are experiencing a network connectivity problem.

The above values, fields, and combination of values are provided as an example, and analysis device 230 may compare other values (and/or other combinations of values) associated with other fields (and/or other combinations of fields) to a threshold to identify a pattern. In some implementations, analysis device 230 may use any of the dropped connection information described above to identify a pattern associated with dropped connections (e.g., information associated with dropped connection(s), information associated with mobile device(s) 210, information associated with user(s) of mobile device(s) 210, information associated with wireless access point(s) 220, information associated with network(s), information associated with location(s), or the like). For example, analysis device 230 may determine whether a BSSID value appears a threshold quantity of times (e.g., indicating a problem with a wireless access point 220), whether a user identifier appears a threshold quantity of times (e.g., indicating a problem with a user), whether a mobile device type identifier appears a threshold quantity of times (e.g., indicating a problem with a particular type of mobile device 210), or the like.

As further shown in FIG. 4, process 400 may include identifying a destination associated with the pattern (block 440). For example, analysis device 230 may identify a destination associated with the pattern. In some implementations, analysis device 230 may store information that identifies a pattern and/or a problem associated with the pattern, and may store information that identifies a destination associated with the pattern and/or associated with resolving the problem associated with the pattern. Analysis device 230 may use the stored information to identify the destination using information that identifies the pattern and/or the problem.

The destination may include, for example, a destination device to which a notification is to be sent, an email address to which a notification is to be sent, a telephone number to which a notification is to be sent, or the like. The destination may be associated with a party responsible for resolving the problem. In this way, analysis device 230 may notify an appropriate party to remedy a problem associated with the pattern. For example, if analysis device 230 identifies a problem associated with an operating system, an application, or the like, analysis device 230 may inform a party responsible for managing the operating system, the application, or the like. Similarly, if analysis device 230 identifies a problem associated with a wireless access point 220, analysis device 230 may inform a party responsible for managing the wireless access point 220.

As further shown in FIG. 4, process 400 may include providing report information, associated with the pattern, to the destination (block 450). For example, analysis device 230 may provide report information to the destination (e.g., to a device, to an email address, to a device associated with a phone number, etc.). The report information may include, for example, information that indicates that the pattern was identified, information that identifies the pattern, information that identifies a problem associated with the pattern, information that identifies a quantity of times that the pattern was identified, or the like.

In some implementations, analysis device 230 may provide report information via a user interface, or may provide report information to another device for presentation via a user interface. The report information may include dropped connection information, in some implementations. Additional details regarding report information are described below in connection with FIGS. 5B and 5C. In this way, analysis device 230 may provide a notification to a party responsible for resolving a problem associated with a pattern regarding dropped connections, and may assist with improving network connectivity, thereby increasing network reliability and conserving network resources.

In some implementations, analysis device 230 may cause an action to be performed, such as by sending an instruction to wireless access point 220 and/or a mobile device 210. For example, analysis device 230 may send an instruction to cause wireless access point 220 and/or mobile device 210 to reboot, to report logged information, to shut down, to install software, to update software, to run a self-check, or the like. In this way, analysis device 230 may assist in automatically resolving problems with dropped connections.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
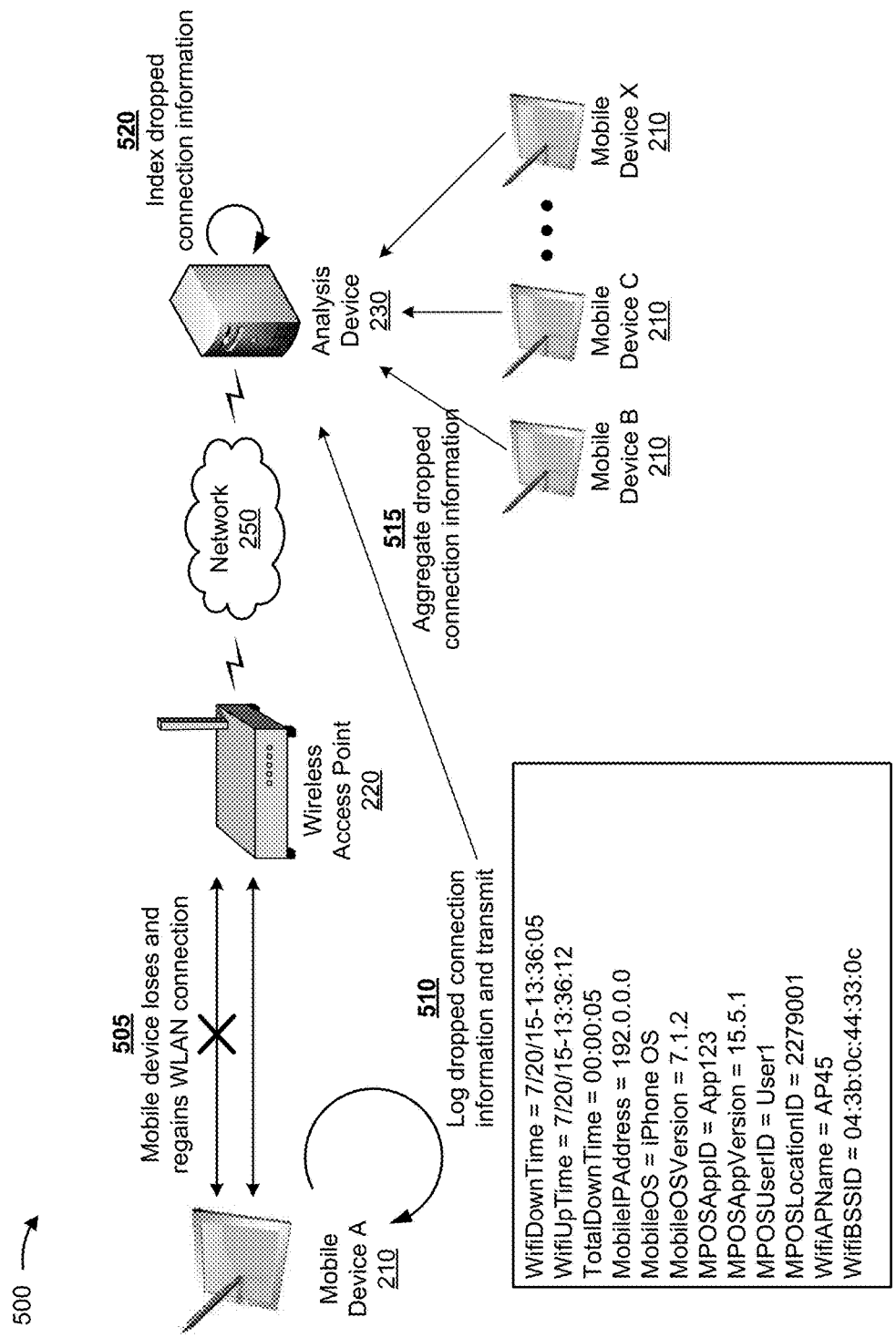
FIGS. 5A-5C are diagrams of an example implementation relating to the example process shown in FIG. 4.
Figure 5B:
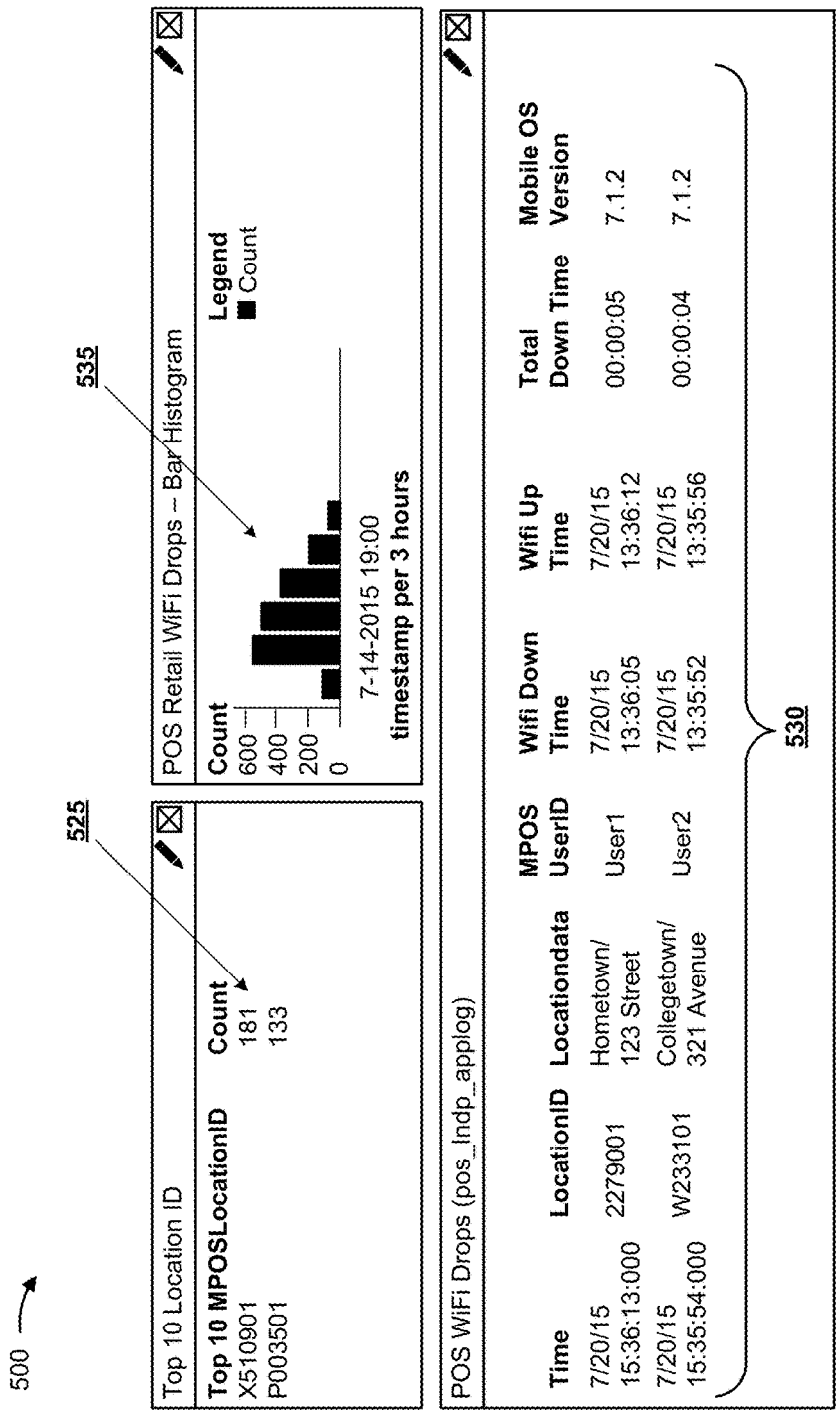
Figure 5C:
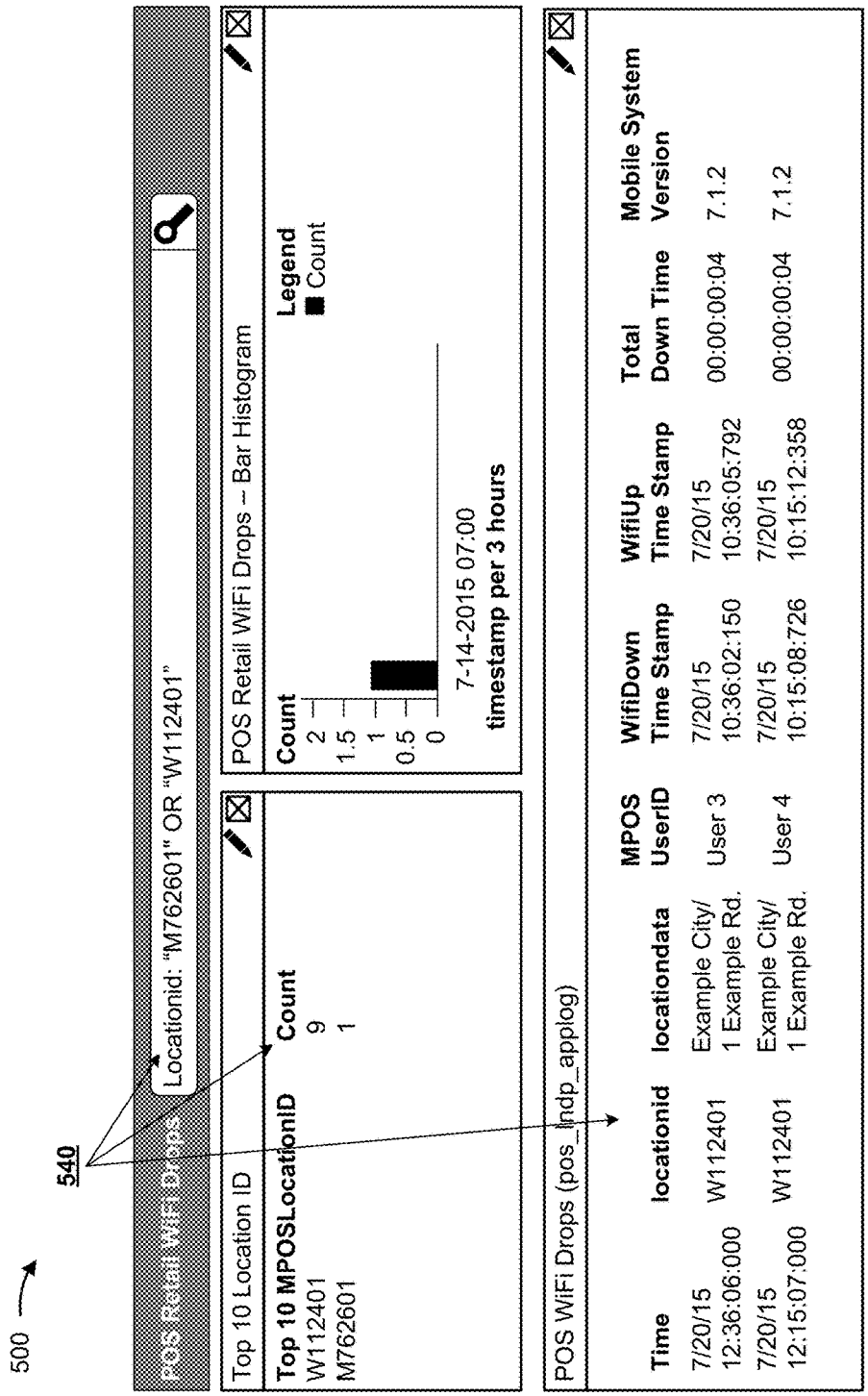

FIGS. 5A-5C are diagrams of an example implementation 500 relating to example process 400 shown in FIG. 4. FIGS. 5A-5C show an example of analyzing dropped wireless local area network connections.

As shown in FIG. 5A, and by reference number 505, assume that mobile device 210, shown as Mobile Device A, loses and regains a WLAN connection with wireless access point 220. As shown by reference number 510, based on losing and regaining the WLAN connection, Mobile Device A logs dropped connection information, and transmits the dropped connection information to analysis device 230. As shown by reference number 515, analysis device 230 aggregates dropped connection information from multiple mobile devices 210. As shown by reference number 520, analysis device 230 indexes the dropped connection information using a data structure.

As an example, and as shown, the dropped connection information may include a downtime indicator (e.g., "Wifi-DownTime") that indicates a time when the connection was dropped (e.g., "7/20/15-13:36:05"), an uptime indicator (e.g., "WifiUpTime") that indicates a time when the connection was restored (e.g., "7/20/15-13:36:12"), and a downtime duration indicator (e.g., "TotalDownTime") that indicates a length of time that the dropped connection was down (e.g., "00:00:05," indicating that the connection was down for 5 seconds).

As further shown, the dropped connection information may include a mobile device identifier (e.g., "MobileIPAddress") that identifies an IP address of Mobile Device A (e.g., "192.0.0.0"), an operating system type identifier (e.g., "MobileOS") that identifies a type of operating system executing on Mobile Device A (e.g., "iPhone OS"), an operating system version identifier that identifies a version of the operating system (e.g., "7.1.2"), an application identifier (e.g., "MPOSAppID," indicating an identifier for a mobile point of sale (MPOS) application) that identifies an application executing on Mobile Device A (e.g., "App123"), and an application version identifier (e.g., "MPOSAppVersion") that identifies a version of the application (e.g., "15.5.1"). As further shown, the dropped connection information may include a user identifier (e.g., "MPOSUserID") that identifies a user (e.g., "User1") who was logged into the application when the connection was dropped.

As further shown, the dropped connection information may include a location identifier (e.g., "MPOSLocationID") that identifies a location associated with the dropped connection (e.g., "2279001," which is a store identifier that identifies a store in which the MPOS application is being used and in which the dropped connection occurred), a wireless access point name (e.g., "WifiAPName") that represents a name of wireless access point 220 involved with the dropped connection (e.g., "AP45"), and a BSSID (e.g., "WifiBSSID") that represents a BSSID of wireless access point 220 involved with the dropped connection (e.g., "04:3b:0c:44:33:0c").

The dropped connection information described above is provided as an example. In practice, mobile device 210 may log and/or provide more dropped connection information, less dropped connection information, or different dropped connection information.

As shown in FIG. 5B, analysis device 230 may provide a user interface that displays report information associated with dropped connections. For example, the report information may indicate a quantity of dropped connections associated with a particular location, as shown by reference number 525. Additionally, or alternatively, the report information may include dropped connection information, as shown by reference number 530. Additionally, or alternatively, the report information may include a graphical depiction that shows a quantity of dropped connections associated with multiple locations, a quantity of dropped connections associated with different time periods, or the like, as shown by reference number 535.

As shown in FIG. 5C, a user may interact with the user interface to search for particular information. For example, the user may use a search mechanism to input one or more location identifiers, and the user interface may provide a quantity of dropped connections and/or other dropped connection information associated with the location identifiers, as shown by reference number 540. In this way, a user may identify problems associated with dropped connections, and may resolve such problems, thereby improving network reliability.

As indicated above, FIGS. 5A-5C are provided merely as an example. Other examples are possible and may differ from what was described with regard to FIGS. 5A-5C.

Implementations described herein provide a way to identify problems associated with dropped WLAN connections by analyzing dropped connection information for patterns associated with the dropped WLAN connections. In this way, network reliability may be increased, and network resources may be conserved by preventing dropped WLAN connections (e.g., by resolving problems associated with dropped WLAN connections).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive dropped connection information associated with a plurality of dropped wireless local area network (WLAN) connections,
the dropped connection information including at least two of:
a location identifier that identifies a location associated with a dropped WLAN connection,
a downtime indicator for indicating a time when the dropped WLAN connection was dropped;
an uptime indicator for indicating a time when the dropped WLAN connection was restored,
a downtime duration indicator for indicating a length of time the dropped WLAN connection was down,
information associated with a mobile device, of one or more mobile devices, that experienced the dropped WLAN connection of the plurality of dropped WLAN connections,
information associated with a user of the mobile device,
information associated with a WLAN access point that experienced the dropped WLAN connection, or
information associated with a WLAN from which the mobile device was dropped;
analyze the dropped connection information;
identify a pattern associated with the plurality of dropped WLAN connections based on analyzing the dropped connection information; and
provide information associated with the pattern to permit a problem, associated with the pattern, to be resolved,
the information including a graphical depiction of at least one of:
a quantity of dropped WLAN connections of the plurality of WLAN dropped connections associated with multiple locations, or
a quantity of dropped WLAN connections of the plurality of WLAN dropped connections associated with different time periods.

2. The device of claim 1, where the one or more processors, when identifying the pattern, are to:
determine a quantity of times that a value occurs in the dropped connection information;
determine that the quantity of times satisfies a threshold; and
where the one or more processors, when providing the information associated with the pattern, are to:
provide information that identifies the quantity of times that the value occurs in the dropped connection information.

3. The device of claim 1, where the one or more processors, when identifying the pattern, are to:
determine a quantity of times that a combination of values occurs in the dropped connection information;
determine that the quantity of times satisfies a threshold; and
where the one or more processors, when providing the information associated with the pattern, are to:
provide information that identifies the quantity of times that the combination of values occurs in the dropped connection information.

4. The device of claim 1, where the one or more processors, when providing the information associated with the pattern, are to:
identify a party associated with the pattern; and
provide the information associated with the pattern to a destination associated with the party.

5. The device of claim 1, where the dropped connection information includes the information associated with the WLAN access point that experienced the dropped WLAN connection.

6. The device of claim 1, where the dropped connection information includes the information associated with the WLAN from which the mobile device was dropped.

7. The device of claim 1, where the location identifier is a store identifier associated with a store in which the dropped WLAN connection occurred.

8. A computer-readable medium storing instructions, the instructions comprising:
one or more instructions that, when executed by one or more processors, cause the one or more processors to:
aggregate dropped connection information associated with a plurality of dropped network connections,
the dropped connection information including at least two of:
a location identifier that identifies a location associated with a dropped network connection,
a downtime indicator for indicating a time when the dropped network connection was dropped;
an uptime indicator for indicating a time when the dropped network connection was restored,
a downtime duration indicator for indicating a length of time the dropped network connection was down,
information associated with a mobile device, of a plurality of mobile devices, that experienced the dropped network connection of the plurality of dropped network connections,
information associated with a user of the mobile device,
information associated with an access point that experienced the dropped network connection, or
information associated with a network from which the mobile device was dropped;
identify a pattern associated with the plurality of dropped network connections based on aggregating the dropped connection information; and
provide reporting information associated with the pattern,
the reporting information including a graphical depiction of at least one of:
a quantity of dropped network connections of the plurality of dropped network connections associated with multiple locations, or
a quantity of dropped network connections of the plurality of dropped network connections associated with different time periods.

9. The computer-readable medium of claim 8, where the one or more instructions, when executed by the one or more processors, further cause the one or more processors to:
store the dropped connection information in a data structure;

where the one or more instructions, that cause the one or more processors to identify the pattern, cause the one or more processors to:
   determine a quantity of times that a value, received in the dropped connection information, occurs in the data structure; and
   identify the pattern based on determining the quantity of times that the value occurs in the data structure.

10. The computer-readable medium of claim 8, where the one or more instructions, when executed by the one or more processors, further cause the one or more processors to:
   store the dropped connection information in a data structure;
   where the one or more instructions, that cause the one or more processors to identify the pattern, cause the one or more processors to:
   determine a quantity of times that a combination of values, received in the dropped connection information, occurs in the data structure; and
   identify the pattern based on determining the quantity of times that the combination of values occurs in the data structure.

11. The computer-readable medium of claim 8, where the plurality of dropped network connections are a plurality of dropped wireless local area network (WLAN) connections.

12. The computer-readable medium of claim 8, where the dropped connection information includes the information that identifies the location associated with the dropped network connection.

13. The computer-readable medium of claim 8, where the dropped connection information includes at least one of:
   information associated with the plurality of mobile devices,
   information associated with a plurality of users associated with the plurality of mobile devices,
   information associated with a plurality of access points associated with the plurality of dropped network connections,
   information associated with a plurality of networks associated with the plurality of dropped network connections, or
   information that identifies a plurality of locations associated with the plurality of dropped network connections.

14. The computer-readable medium of claim 8, where the location identifier is a store identifier associated with a store in which the dropped network connection occurred.

15. A method, comprising:
   receiving, by a device, dropped connection information associated with a plurality of dropped wireless local area network (WLAN) connections,
      the dropped connection information including at least two of:
         location identifiers that identify locations associated the one or more dropped WLAN connections,
         a downtime indicator for indicating a time when the dropped WLAN connection was dropped;
         an uptime indicator for indicating a time when the dropped WLAN connection was restored,
         a downtime duration indicator for indicating a length of time the dropped WLAN connection was down,
         information associated with a plurality of mobile devices that experienced the one or more dropped WLAN connections of the plurality of dropped WLAN connections,
         information associated with a plurality of users associated with one or more mobile devices of the plurality of mobile devices,
         information associated with a plurality of WLAN access points that experienced the one or more dropped WLAN connections, or
         information associated with a plurality of networks associated with the plurality of dropped WLAN connections;
   storing, by the device, the dropped connection information in a data structure;
   analyzing, by the device, the dropped connection information stored in the data structure;
   identifying, by the device, a pattern associated with the plurality of dropped WLAN connections based on analyzing the dropped connection information stored in the data structure; and
   providing, by the device, information associated with the pattern based on identifying the pattern,
      the information including a graphical depiction of at least one of:
         a quantity of the dropped connections associated with multiple locations, or
         a quantity of the dropped connections associated with different time periods.

16. The method of claim 15, where the pattern is based on a quantity of times that a value, associated with at least one dropped WLAN connection of the plurality of dropped WLAN connections, occurs in the dropped connection information stored in the data structure.

17. The method of claim 15, where the pattern is based on a quantity of times that a combination of values, associated with at least one dropped WLAN connection of the plurality of dropped WLAN connections, occurs in the dropped connection information stored in the data structure.

18. The method of claim 15, where the pattern is indicative of a problem that causes at least one dropped WLAN connection of the plurality of dropped WLAN connections; and
   where providing the information associated with the pattern comprises:
      identifying a destination associated with the problem; and
      providing the information associated with the pattern to the destination.

19. The method of claim 15, where the dropped connection information includes the information associated with the plurality of WLAN access points.

20. The method of claim 15, where a location identifier of the location identifiers is a store identifier associated with a store in which the dropped WLAN connection occurred.

* * * * *